United States Patent
Weidner et al.

(10) Patent No.: US 7,454,277 B2
(45) Date of Patent: Nov. 18, 2008

(54) AIRBAG FIRING ELECTRONIC SYSTEM FOR VEHICLES

(75) Inventors: Marcus Weidner, Weilheim (DE); Jan Urbahn, Ramsey (DE); Richard Baur, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/647,239

(22) Filed: Dec. 29, 2006

(65) Prior Publication Data

US 2007/0108749 A1  May 17, 2007

Related U.S. Application Data

(63) Continuation of application No. PCT/EP2005/006605, filed on Jun. 18, 2005.

(30) Foreign Application Priority Data

Jul. 7, 2004 (DE) .................. 10 2004 032 732

(51) Int. Cl.
*B60R 21/01* (2006.01)
*B60R 21/134* (2006.01)
(52) U.S. Cl. .............. 701/45; 280/735; 180/271; 180/282; 340/436; 340/438; 307/10.1
(58) Field of Classification Search .......... 280/735; 701/45; 180/271, 282; 340/436, 438; 307/10.1
See application file for complete search history.

(56) References Cited

U.S. PATENT DOCUMENTS 5,389,751 A * 2/1995 Breed .................. 200/61.45 R
5,702,123 A * 12/1997 Takahashi et al. ............ 280/735
5,770,997 A * 6/1998 Kleinberg et al. ............ 340/438

(Continued)

FOREIGN PATENT DOCUMENTS

DE  36 37 165 A1  5/1988

(Continued)

OTHER PUBLICATIONS

A treatise on crash sensing for automotive air bag systems; Ching-Yao Chan; Mechatronics, IEEE/ASME Transactions on ☐☐vol. 7, Issue 2, Jun. 2002 pp. 220-234, Digital Object Identifier 10.1109/TMECH.2002.1011259.*

(Continued)

*Primary Examiner*—Cuong H Nguyen
(74) *Attorney, Agent, or Firm*—Crowell & Moring LLP

(57) ABSTRACT

A vehicle includes an airbag system, a sensor unit, which includes a first sensor module, which permits the sensing of actual driving conditions, and an electronic system, which fires the airbag system in the event of a crash and which is designed to evaluate the sensor signals that are provided by the sensor unit. The electronic system carries out a comparison of sensed actual driving conditions with predetermined critical driving conditions, which indicate a crash. The sensor unit includes a second sensor module, which senses in advance the environmental conditions of the vehicle, which after a certain period of time may lead to critical actual driving conditions. Critical actual driving conditions, whose imminent occurrence has been indicated in advance by the second sensor module, are rated by the electronic system as crash-free driving conditions.

16 Claims, 2 Drawing Sheets

U.S. PATENT DOCUMENTS

Figure 1:
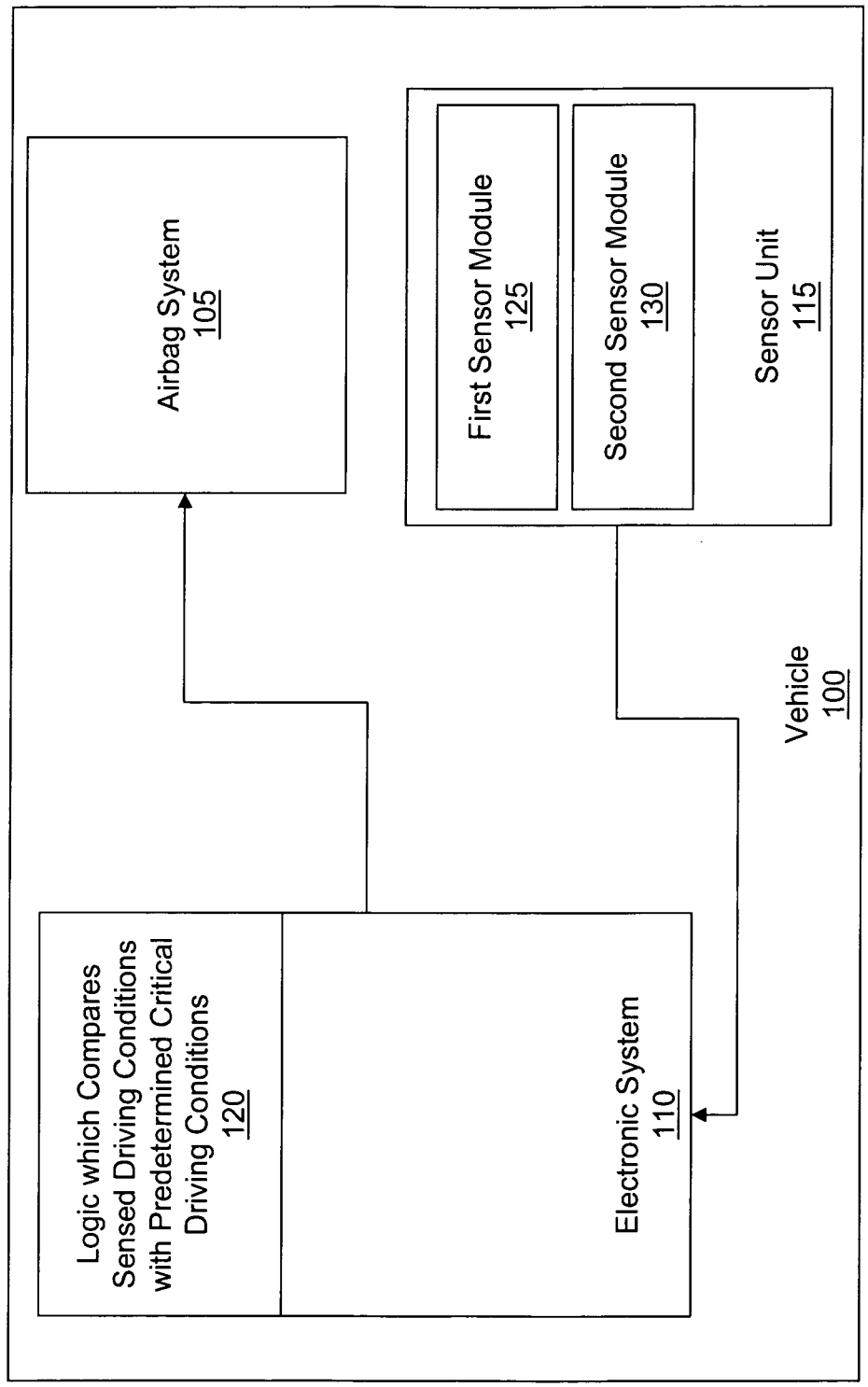

| | | | |
|---|---|---|---|
| 5,808,197 A * | 9/1998 | Dao | 73/514.09 |
| 6,037,860 A | 3/2000 | Zander et al. | |
| 6,068,287 A * | 5/2000 | Nitschke et al. | 280/735 |
| 6,168,198 B1 * | 1/2001 | Breed et al. | 280/735 |
| 6,242,701 B1 * | 6/2001 | Breed et al. | 177/144 |
| 6,254,127 B1 * | 7/2001 | Breed et al. | 280/735 |
| 6,283,503 B1 * | 9/2001 | Breed et al. | 280/735 |
| 6,370,461 B1 | 4/2002 | Pierce et al. | |
| 6,419,265 B1 * | 7/2002 | Breed | 280/735 |
| 6,422,595 B1 * | 7/2002 | Breed et al. | 280/735 |
| 6,532,408 B1 * | 3/2003 | Breed | 701/45 |
| 6,598,900 B2 * | 7/2003 | Stanley et al. | 280/735 |
| 6,609,055 B2 * | 8/2003 | Stanley | 701/45 |
| 6,856,906 B2 | 2/2005 | Winner et al. | |
| 6,907,335 B2 | 6/2005 | Oswald et al. | |
| 7,011,175 B2 * | 3/2006 | Link et al. | 180/274 |
| 7,126,239 B2 | 10/2006 | Bentele-Calvor et al. | |
| RE39,868 E * | 10/2007 | Breed | 280/735 |
| 2002/0003345 A1 * | 1/2002 | Stanley et al. | 280/735 |
| 2003/0069677 A1 | 4/2003 | Boran et al. | |
| 2003/0083795 A1 * | 5/2003 | Stanley | 701/45 |
| 2004/0006427 A1 | 1/2004 | Stiller | |
| 2004/0019420 A1 | 1/2004 | Rao et al. | |
| 2005/0000748 A1 * | 1/2005 | Link et al. | 180/282 |
| 2005/0242932 A1 | 11/2005 | Schneider et al. | |
| 2006/0164218 A1 | 7/2006 | Kuttenberger et al. | |
| 2007/0108749 A1 * | 5/2007 | Weidner et al. | 280/735 |

FOREIGN PATENT DOCUMENTS

| | | | |
|---|---|---|---|
| DE | 197 41 631 A1 | | 3/1999 |
| DE | 198 22 184 A1 | | 11/1999 |
| DE | 696 16 624 E | * | 12/2001 |
| DE | 101 28 141 A1 | | 1/2002 |
| DE | 100 50 956 A1 | | 5/2002 |
| DE | 101 07 272 A1 | | 8/2002 |
| DE | 101 32 681 C1 | | 8/2002 |
| DE | 101 31 198 A1 | | 1/2003 |
| DE | 102 47 670 A1 | | 4/2003 |
| DE | 102 12 902 A1 | | 10/2003 |
| DE | 102 31 362 A1 | | 1/2004 |
| DE | 102 43 508 A1 | | 4/2004 |
| DE | 103 41 754 A1 | | 5/2005 |
| EP | 734921 A2 | * | 10/1996 |
| GB | 2356075 A | * | 5/2001 |
| JP | 2007069711 A | * | 3/2007 |
| KR | 2005061690 A | * | 6/2005 |
| KR | 630841 B1 | * | 10/2006 |
| WO | WO 0132475 A1 | * | 5/2001 |
| WO | WO 0170445 A1 | * | 9/2001 |
| WO | WO 03/006291 A1 | | 1/2003 |
| WO | WO 03042006 A1 | * | 5/2003 |
| WO | WO 2004/029654 A1 | | 4/2004 |

OTHER PUBLICATIONS

On the detection of vehicular crashes-system characteristics and architecture, Ching-Yao Chan; Vehicular Technology, IEEE Transactions on; vol. 51, Issue 1, Jan. 2002 pp. 180-193, Digital Object Identifier 10.1109/25.992078.*

Trends in Crash Detection and Occupant Restraint Technology, Ching-Yao Chan; Proceedings of the IEEE, vol. 95, Issue 2, Feb. 2007 pp. 388-396, Digital Object Identifier 10.1109/JPROC.2006.888391.*

Compliant MEMS Crash Sensor Designs: The Preliminary Simulation Results, Sonmez, U.; Intelligent Vehicles Symposium, 2007 IEEE, Jun. 13-15, 2007 pp. 303-308, Digital Object Identifier 10.1109/IVS.2007.4290131.*

Integrated Nanoporous Silicon Nano-explosive Devices du Plessis, M.; Industrial Electronics, 2007. ISIE 2007. IEEE International Symposium on Jun. 4-7, 2007 pp. 1574-1579, Digital Object Identifier 10.1109/ISIE.2007.4374838.*

Vehicle Detection with Three Dimensional Object Models; Wender, S.; Clemen, S.; Kaempchen, N.; Dietmayer, K.C.J.; Multisensor Fusion and Integration for Intelligent Systems, 2006 IEEE International Conference on, Sep. 2006 pp. 462-467; Digital Object Identifier 10.1109/MFI.2006.265605.*

A study of safety applications in vehicular networks; Merlin, C.J.; Heinzelman, W.B.;Mobile Adhoc and Sensor Systems Conference, 2005. IEEE International Conference on; Nov. 7-10, 2005 p. 8 pp.; Digital Object Identifier 10.1109/MAHSS.2005.1542781.*

Intelligent headrest; Fielding, M.; Mullins, J.; Nahavandi, S.; Creighton, D.; Systems, Man and Cybernetics, 2005 IEEE International Conference on; vol. 2, Oct. 10-12, 2005 pp.1240-1245 vol. 2; Digital Object Identifier 10.1109/ICSMC.2005.1571316.*

Robust occupancy detection from stereo images; Alefs, B.; Clabian, M.; Bischof, H.; Kropatsch, W.; Khairallah, F.; Intelligent Transportation Systems, 2004. Proceedings. The 7th International IEEE Conference on, Oct. 3-6, 2004 pp. 1-6 Digital Object Identifier 10.1109/ITSC.2004.1398862.*

International Search Report dated Oct. 7, 2005 with English translation of relevant portion (Five (5) pages).

German Search Report dated Jan. 20, 2005 with English translation of relevant portion (Eight (8) pages).

German Search Report dated Mar. 24, 2006 with English translation of relevant portion (Seven (7) pages).

* cited by examiner

AIRBAG FIRING ELECTRONIC SYSTEM FOR VEHICLES

CROSS REFERENCE TO RELATED APPLICATIONS

This application is a continuation of PCT International Application No. PCT/EP2005/006605, filed Jun. 18, 2005, which claims priority under 35 U.S.C. § 119 to German Patent Application No. 10 2004 032 732.7, filed Jul. 7, 2004, the entire disclosures of which are herein expressly incorporated by reference.

BACKGROUND AND SUMMARY OF THE INVENTION

The present invention relates to a vehicle comprising an airbag firing electronic system.

Very strict requirements are imposed on the firing behavior of vehicle airbags. It must be ensured that the airbag system detects physical conditions occurring in the event of a crash as "fire conditions" and reliably fires the airbag. However, "misuse conditions," which may share a certain degree of similarity with the physical conditions that are characteristic of crashes, should be positively distinguishable from "fire conditions." To address these issues airbag systems are equipped with a variety of sensors, such as: acceleration sensors, which measure accelerations that are typical in the event of a crash; deformation sensors, which measure typical deformation of modules in the event of a crash; air pressure sensors, which measure, for example, the increase in air pressure that occurs in the door cavity in the event of a side collision; and the like. The single measurement and the monitoring of the "actual curves" of such signal signatures conceal the risk of measuring a signal progression that indicates a crash, even though there is no crash or a crash has not occurred yet, a state that may lead to a misfiring of the airbag system.

Therefore, critical accelerations may occur when a curbstone or a pothole is driven over at high speed. Such acceleration peaks are problematic, especially when they occur just before an actual crash. For example, a problem can occur when a vehicle skids off the road, drives over a curbstone, and the airbag is activated due to the resulting acceleration, and then the vehicle hits an impediment. In this case there is the risk that the airbag will be fired too early and, hence, is no longer available with its full ability during the actual crash.

One aspect of the invention is to provide a vehicle with an airbag firing sensor system, which avoids the aforementioned problems.

Other objects, advantages and novel features of the present invention will become apparent from the following detailed description of the invention when considered in conjunction with the accompanying drawings.

BRIEF DESCRIPTION OF THE DRAWING FIGURES

Figure 2:
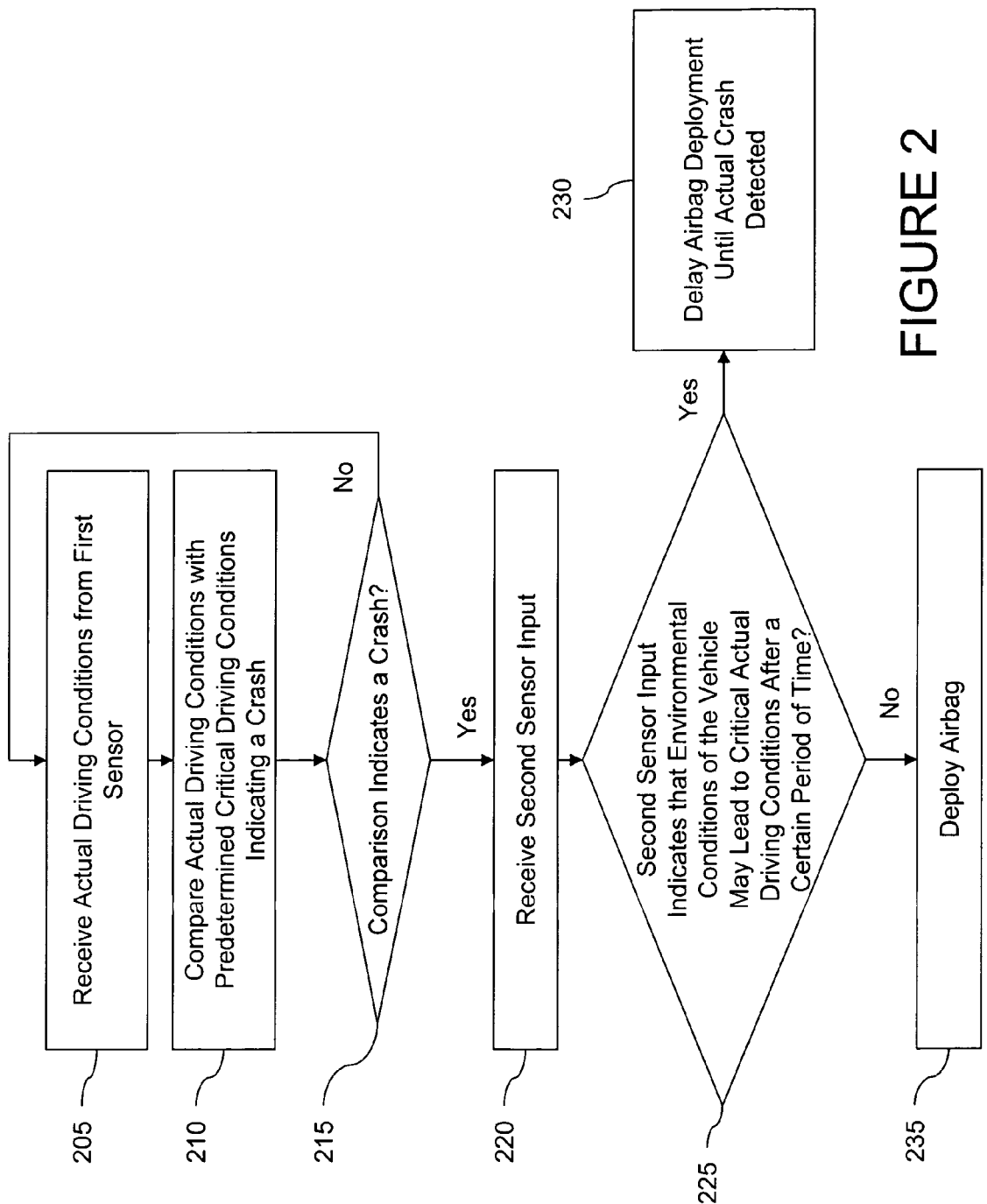

FIG. 1 illustrates an exemplary vehicle in accordance with the present invention; and FIG. 2 illustrates an exemplary method in accordance with the present invention.

DETAILED DESCRIPTION OF THE DRAWINGS

The invention is based on a vehicle comprising an airbag system and a sensor unit, which includes a first sensor module, which permits a sensing of the "actual driving conditions" that occur momentarily. The "first sensor module" of the present invention is not necessarily restricted to a specific physical sensor arrangement, but can include any type of sensor function. Furthermore, the phrase "actual driving condition" is intended to be interpreted broadly to include any type of driving conditions. Therefore, it may be provided that the first sensor module measures the acceleration of a vehicle in a predetermined spatial direction, the deformation of a component, a specific system pressure, or the like. The airbag system is allocated an electronic system, which activates the airbag system in the event of a crash. The electronic system evaluates the sensor signals, which are provided by the sensor unit, in determining whether a crash condition exists. At the same time the electronic system carries out a comparison of the sensed "actual driving conditions" with the predetermined driving conditions, which are deemed critical and which indicate a crash. Predetermined driving conditions, such as predetermined critical acceleration limits, pressure limits, deformation limits, and the like may be stored in the electronic system.

In accordance with exemplary embodiments of the present invention, the sensor unit includes a "second sensor module," which senses in advance the environmental conditions of the vehicle, which after a certain period of time may lead to critical actual driving conditions. The "second sensor module" should also be broadly interpreted. The first and second sensor modules may be two different physical sensor units, or combined as one physical sensor unit. One aspect of the present invention involves the second sensor module sensing in advance the environmental conditions of the vehicle, i.e., before the impact of the environmental conditions on the vehicle results in specific actual driving conditions. If the sensor unit detects environmental conditions that may lead to critical actual driving conditions, i.e., when critical actual driving conditions may be predicted, and then actually occur, they are not perceived as a crash, but rather as crash-free conditions. Therefore, exemplary embodiments of the present invention detect in advance "misuse conditions," such as driving over a curbstone or a deep pothole, and evaluate the resulting "misuse driving conditions," like exceeding the predetermined critical acceleration values, the vibration frequencies, etc., as the logical consequence of these misuse conditions and not as a crash. Therefore, an "inadvertent" activation of the airbag system under misuse conditions may be avoided.

"Road irregularities," like curbstones, potholes, or the like, may be detected with such a sensor system, before the vehicle drives over such irregularities and before the respective "signatures," such as cross accelerations, longitudinal accelerations or vertical accelerations in the vehicle may occur that may lead to an inadvertent activation of the airbag. Since such "signatures" can be sensed in advance, the occurrence of critical "actual driving conditions" may be predicted as a function of the direction of travel and the driving speed. Therefore, critical signatures may be faded out or rather "calculated out" of the measured signal progression, in order to avoid an inadvertent activation of the airbag system.

According to a further aspect of the present invention, the second sensor module includes a sensor unit that scans the environment in the front area of the vehicle. Hence, the environmental or the road area, located in front of the front wheels of the vehicle, may be scanned. The scan may be carried out by using radar sensors, optical sensors (e.g., a camera system), acoustic sensors, and in particular by ultrasonic sensors or other sensor systems. An environmental area, which is located up to one meter or up to two meters in front of the front wheels of the vehicle or in front of the front end of the vehicle, may be scanned.

According to a further aspect of the present invention, the signals, provided by the second sensor module, may be used for an active control of the vehicle subsystems. Therefore, in a driving situation in which the vehicle is actively braked by a braking intervention, the braking force at the individual brakes or at all brakes of the vehicle is disengaged or decreased for a short period of time just before driving over an impediment. Since in a braking procedure the front axle is loaded more than the rear axle owing to the dynamic distribution of the axle load, driving over an impediment in the braked state leads to very high vehicle jolts. A short-term disengagement of the brakes and/or a decrease in the brake pressure at the individual or all brakes of the vehicle may decrease and/or avoid such an additional load.

In a vehicle, which is equipped with an active suspension system, the spring characteristics of the individual wheel suspensions may be modified when the second sensor module senses the environmental conditions, which after a certain period of time may lead to critical actual driving conditions. Therefore, the spring hardness of the wheel suspensions may be decreased just before driving over a deep pothole.

Insofar as the vehicle is equipped with dynamically adjustable and/or dynamically controllable bearings, they may also be adjusted as a function of the sensor signals provided by the second sensor module, and the expected critical actual driving conditions. Therefore, for example, the damping characteristic of the individual bearings may be modified as a function of the instantaneous environmental conditions. Dynamically adjustable bearings may be used, for example, in the area of the chassis, the motor suspension or the transmission suspension.

FIG. 1 illustrates an exemplary vehicle in accordance with the present invention. Vehicle 100 includes an airbag system 105 coupled to an electronic system 110. The vehicle also includes a sensor unit 115 that includes a first sensor module 125, which permits the sensing of actual driving conditions. Electronic system 110, fires the airbag system in the event of a crash and evaluates the sensor signals that are provided by sensor unit 115. Electronic system 110 includes logic 120 that compares sensed actual driving conditions with predetermined critical driving conditions that indicate a crash. Sensor unit 115 includes a second sensor module 130, which senses in advance the environmental conditions of the vehicle, which after a certain period of time may lead to critical actual driving conditions. Electronic system 110 rates the critical actual driving conditions whose imminent occurrence has been indicated in advance by the second sensor module as crash-free driving conditions.

FIG. 2 illustrates an exemplary method in accordance with the present invention. Actual driving conditions from a first sensor are received and compared to with predetermined critical driving conditions (steps 205 and 210). When the comparison indicates a crash ("Yes" path out of decision step 215), then a second sensor input is received and it is determined whether the second sensor input indicates that environmental conditions of the vehicle may lead to critical actual driving conditions are a certain period of time (steps 220 and 225). When the second sensor input indicates that environmental conditions of the vehicle may lead to critical actual driving conditions after a certain period of time ("Yes" path out of decision step 225), then airbag deployment is delayed until the actual crash is detected (step 230). However, when the second sensor input does not indicate that environmental conditions of the vehicle may lead to critical actual driving conditions are a certain period of time ("No" path out of decision step 225), then the airbag is deployed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle comprising:
an airbag system,
a sensor unit, including a first sensor module that sense actual driving conditions;
an electronic system that fires the airbag system in the event of a crash, evaluates sensor signals provided by the sensor unit, wherein the electronic system includes logic that compares sensed actual driving conditions with predetermined critical driving conditions indicating a crash,
wherein the sensor unit includes a second sensor module, the second sensor module senses in advance environmental conditions of the vehicle that after a certain period of time may lead to critical actual driving conditions,
wherein the electronic system rates the critical actual driving conditions whose imminent occurrence has been indicated in advance by the second sensor module as crash-free driving conditions.

2. The vehicle of claim 1, wherein the second sensor module includes a sensor unit that scans an environment in the front area of the vehicle.

3. The vehicle of claim 1, wherein the second sensor module includes a sensor unit that scans an environmental area of the vehicle that is located in front of front wheels of the vehicle.

4. The vehicle of claim 1, wherein the second sensor module includes a sensor unit that scans an environmental area that is located up to one meter in front of front wheels of the vehicle.

5. The vehicle of claim 1, wherein the second sensor module includes a sensor unit that scans an environmental area that is located up to two meters in front of front wheels of the vehicle.

6. The vehicle of claim 1, wherein the second sensor module includes a sensor unit that scans road reliefs in an area located in front of front wheels of the vehicle.

7. The vehicle of claim 1, wherein the second sensor module includes at least one radar sensor.

8. The vehicle claim 1, wherein the second sensor module includes at least one optical sensor.

9. The vehicle of claim 1, wherein the second sensor module includes at least one acoustic sensor.

10. The vehicle of claim 9, wherein the at least one acoustic sensor is an ultrasonic sensor.

11. The vehicle of claim 1, wherein when the vehicle is actively braked by braking intervention and the second sensor module senses the environmental conditions that on continued braking intervention may lead to critical actual driving conditions, brake pressures actuated at the individual brakes of the vehicle are decreased.

12. The vehicle of claim 1, wherein the vehicle further comprises:
wheel suspensions with actively controllable spring/damping characteristics, wherein when the second sensor senses the environmental conditions that may lead to critical actual driving conditions, the spring/damping characteristics are modified as a function of the expected critical driving conditions.

13. The vehicle of claim 1, wherein the vehicle further comprises:
a vehicle component positioned over a bearing in the vehicle and bearing characteristics of which are actively controllable, wherein when the second sensor module senses the environmental conditions that may lead to critical actual driving conditions, the bearing characteristics are modified as a function of the expected critical driving conditions.

14. A method for controlling airbag deployment of a vehicle that includes an airbag system, an electronic system and a sensor unit, the method comprising the acts of:
receiving actual driving conditions from a first sensor;
comparing the sensed actual driving conditions with predetermined critical driving conditions;
determining that the comparison indicates a crash; and
receiving a second sensor input,
wherein when the second sensor input indicates that environmental conditions of the vehicle may lead to critical actual driving conditions after a certain period of time, then airbag deployment is suppressed.

15. The method of claim 14, further comprising the acts of:
modifying control of an active system when the second sensor input indicates that environmental conditions of the vehicle may lead to critical actual driving conditions after a certain period of time.

16. The method of claim 15, wherein the active system is an active braking intervention system, a wheel suspension system or a bearing characteristic control system.

* * * * *